United States Patent [19]

Taylor

[11] 4,003,564
[45] Jan. 18, 1977

[54] MEANS MOUNTING TORSION SPRINGS

[75] Inventor: George E. Taylor, Wood Dale, Ill.

[73] Assignee: Nachman Corporation, Des Plaines, Ill.

[22] Filed: Sept. 4, 1975

[21] Appl. No.: 610,108

[52] U.S. Cl. .............................. 267/108; 267/112; 5/247

[51] Int. Cl.$^2$ .......................................... F16F 3/02

[58] Field of Search .......... 267/103, 104, 105, 106, 267/107, 108, 109, 112, 142, 144; 5/247, 254, 260; 403/344, 375, 389, 406

[56] References Cited

UNITED STATES PATENTS

| | | | |
|---|---|---|---|
| 2,207,773 | 7/1940 | Bank | 267/112 |
| 2,871,922 | 2/1959 | Stubnitz et al. | 267/108 |
| 3,184,227 | 5/1965 | Viall, Sr. | 267/108 |

FOREIGN PATENTS OR APPLICATIONS 27,153   5/1924   France .............................. 267/108

Primary Examiner—James B. Marbert
Attorney, Agent, or Firm—McDougall, Hersh & Scott

[57] ABSTRACT

A torsion spring assembly in which the means for mounting the bail portion of the torsion spring to a supporting frame comprises an elongate strip having a bore extending lengthwise therethrough dimensioned to receive the bail portion in seated relation therein, an entrant portion communicating with the bore for guiding the bail into the bore, and slots extending crosswise in the strip spaced one from the other longitudinally in a pair to correspond with the spaced relation between the bar supporting side arms of the torsion spring.

5 Claims, 6 Drawing Figures

MEANS MOUNTING TORSION SPRINGS

This invention relates to a torsion spring assembly for box springs and the like and to elements employed in the assembly.

In a torsion spring assembly, use is made of a plurality of torsion springs formed of spring wires with a bottom bar and a top bar forming the bail portions of U-shaped sections joined at their inner ends to torsional loops from which the U-shaped portions extend to form an included angle of about 70° ± 15° and preferably 80°–85°. The torsion springs are arranged in crosswise and lengthwise extending rows, such as eight rows with three springs in each row, and they are secured in their assembled relation by attachment of the bottom bar onto slats extending crosswise of the frame while the upper bar is secured to a grid with the lower U-shaped member extending at an angle of about 40°–50° from the bar. The padding and the like components which make up the box spring, mattress or cushion is supported on the surface of the grid and the assembly is enclosed in a suitable cover or the like.

It is an object of this invention to produce and to provide a method for producing a new and improved means for assembly of the torsion spring to the support whereby the torsion spring may be inserted in position of use in a simple and efficient manner, in which the support permits greater flexibility of the spring unit to give a firm, yet more resilient spring assembly, and which is characterized by increased strength and yet offers greater softness in response to load.

These and other objects and advantages of this invention will hereinafter appear and for purposes of illustration, but not of limitation, an embodiment of the invention is shown in the accompanying drawings in which FIG. 1 is a perspective view of a portion of a torsion spring assembly embodying the features of this invention.

Figure 1:
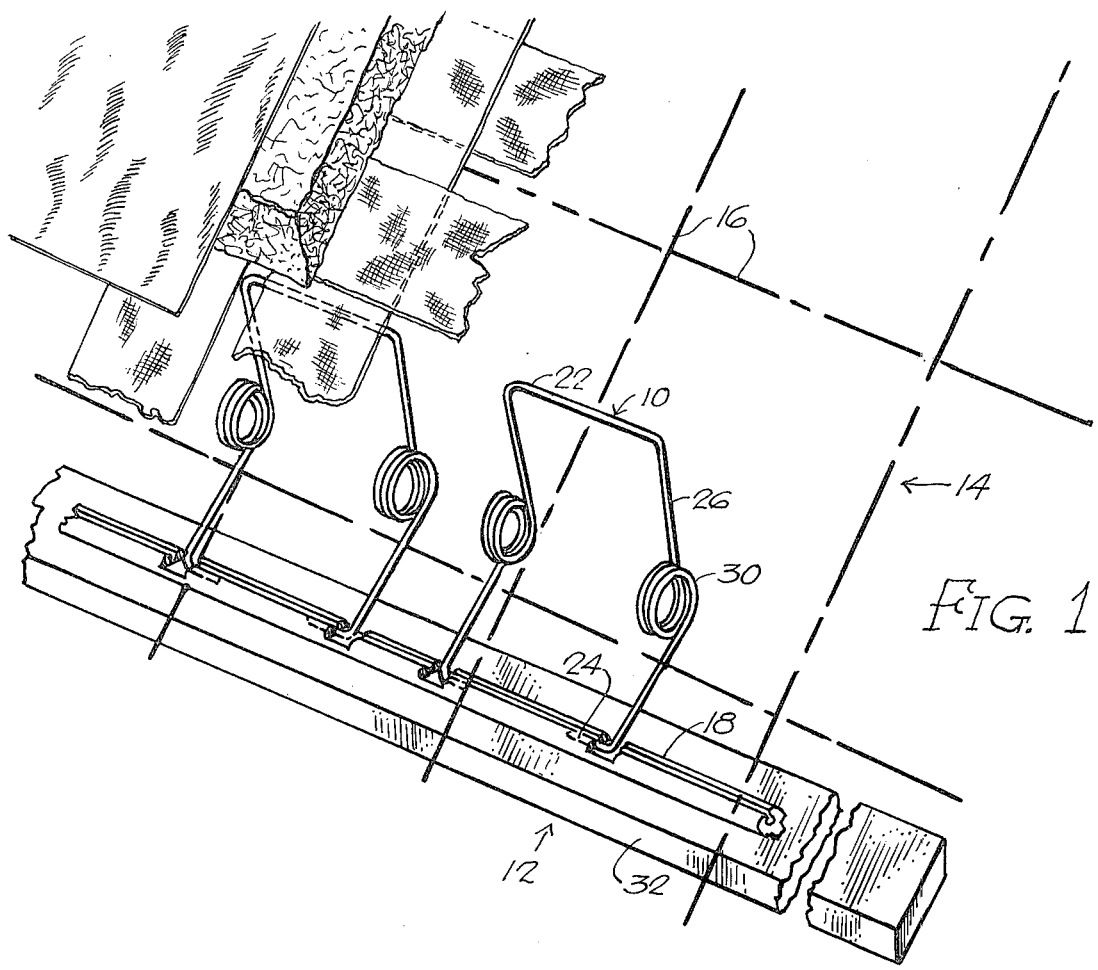
Figure 2:
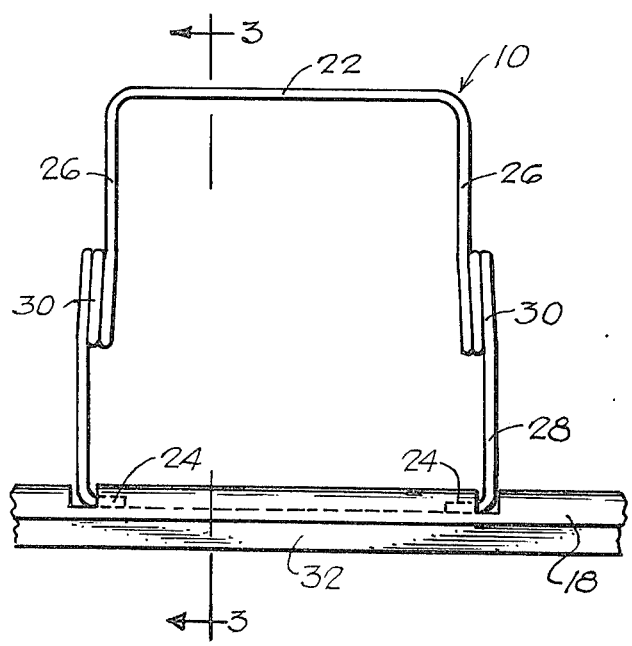
FIG. 2 is a front elevational view showing a torsion spring in the assembled relation, using a strip support in accordance with the practice of this invention.
Figure 3:
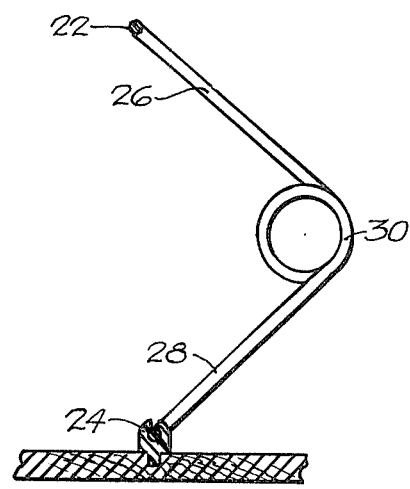
FIG. 3 is an elevational view of the assembly shown in FIG. 2.

The torsion spring assembly comprises a plurality of torsion springs 10 arranged in a number of crosswise and lengthwise rows 12 and 14, with means for securing the springs in the desired arrangement to extend vertically between a wire grid 16 and the top of wooden or plastic slats 18 with the slats secured to form a part of the frame 20.

The torsion springs 10 are of the type previously described, being formed of an integral length of spring wire with a top bar 22, a bottom bar 24 which form the bail portions of the U-shaped sections 26 and 28, joined at their inner ends in one or more torsional loops 30 from which the U-shaped sections extend to define an included angle of 70° ± 15° and preferably 80°–85°.

The torsional springs are mounted in the desired position in the lengthwise and crosswise extending rows by attachment of the lower bars 24 to slats 18 secured at their ends to the frame 20, with the torsion springs extending vertically from the slats at an angle within the range of 40°–50° from the horizontally disposed slats and preferably at an angle of about 46° so that, when the included portions between the bars make an angle of about 85°, the upper bail portion will extend upwardly at an angle of about 139° from the bar, corresponding to an included angle of about 41° from the horizontal axis through the torsional loops 30.

In accordance with the practice of this invention, the assembly of the torsional springs 10 is effected in a manner which enables the springs to be inserted into position of use in a simple and efficient manner, without the need for special tools, special jigs, or skilled labor, and in which the torsion springs are retained in their assembled relation in a manner which enables removal for replacement or repair, and in which a more desirable and softer feel is provided in response to sudden load without sacrificing strength.

For this purpose, use is made of a strip 32 of plastic material with means for attachment of the strip to extend lengthwise from the top surface of the slat 18, as by means of forming the strip with a depending tongue 34 dimensioned to be received in fitting relation in an elongate groove 36 extending inwardly from the surface of the slat, or vice versa by forming the tongue to extend upwardly from the surface of the slat for insertion into a groove in the bottom side of the strip.

The strip 32 is formed with a central bore 38 having a cross section corresponding with the cross section of the wire forming the bail portion 24 of the torsion spring with an entrant portion 40 in the form of a slot extending from the top side of the strip to the bore, in which the slot defines a trapezoidal section having its base of larger dimension outermost and tapering to a width slightly less than the cross section of the wire in the lowermost portion adjacent the bore so that the wire of the bail can be easily introduced through the entrant portion into the bore in a manner to snap into the bore as it clears the entrant portion whereby the wire bail is retained in the bore in the assembled relation.

The strip is formed with longitudinally extending cutouts 42 intersecting the bore 38 with the space between cutouts in a pair corresponding to the distance between bar supporting arms of the torsion spring and with the space between the bars of cutouts corresponding to the spaced relation between the torsion springs mounted on the slat.

Thus, in the assembled relation, the bar portion of the lower bail of the torsion spring will be seated within the bore 38 of the strip 32 with the spaced wires of the arm forming portions of the bail aligned with the cutouts so that the torsion spring will be free to rock about the bore of the strip as a pivot.

While the bar 24 may be in the form of a continuous bail which extends crosswise through the bore between the pair of cutouts, in the preferred practice use is made of a torsion spring in which the bail portion is in the form of short lengths of wire turned inwardly substantially perpendicularly at the opposite ends of the arm to extend crosswise into the bore from the cutout portions. This permits considerable savings to be experienced from the standpoint of weight and cost of the torsion springs and the ease of assembly and disassembly into the spring unit.

In assembly, the strips can be inserted in position of use in the grooves routed out of the wooden slat or molded into plastic or metal slats and the slats secured at their ends in the desired space relation in the frame.

Instead, the slats can be secured in the frame for later insertion of the strip.

Then the torsion springs are inserted in position of use in the strips. When insertion is made manually, it is only necessary to align the side arms of the lower bail with the cutouts and then press the inturned end portions through the entrant portions until the wires snap into position of use in the bore. After all of the torsion springs have been thus assembled onto the slats, the bars of the upper bail portion are secured to the grid, as by means of clips or fastening menas pre-positioned on the grid to secure the torsion springs between the grid and slats in the desired angular relation.

Thereafter the matting can be placed on the grid and the assembly enclosed within a cover. The torsion spring assembly can be used alone as the component of the bed spring, mattress or furniture, or it can be used in combination with other spring elements, such as coil spring members of conical or hourglass shape, as in an assembly wherein the torsion spring provides the middle core and coil springs are disposed about the core, between the slats and grid in an outer spring assembly.

Figure 4:
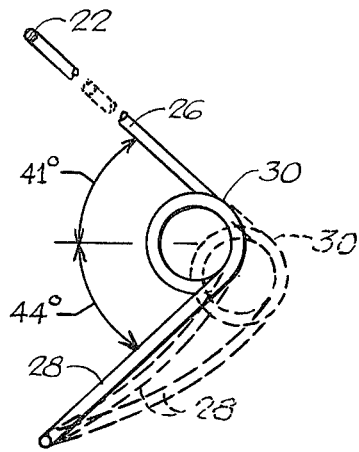
FIG. 4 is a view similar to that of FIG. 3 showing the deflections which take place in response to load.
Figure 6:
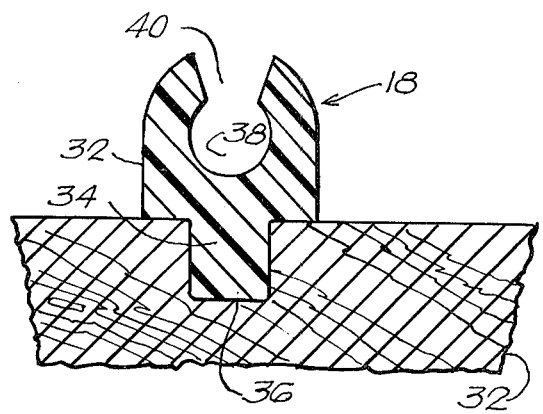
FIG. 6 is an end view in section of the strip shown in FIG. 1.
Figure 5:
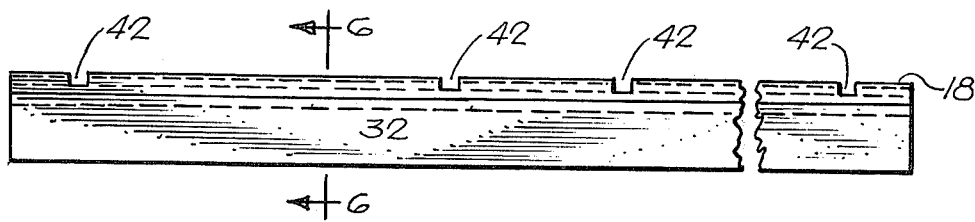
FIG. 5 is a side elevational view of the strip.

FIG. 4 illustrates the improvement in feel that is derived by the assembly embodying the features of this invention, in response to force. When such weight or force is initially applied, the lower bail portion is capable of deflection, as illustrated by the broken lines in FIG. 4, before the lower arm position approaches the ultimate position shown in dot-dash lines in FIG. 4. This corresponds to the reactions of a straight arm in strength, yet gives greater softness under such higher load conditions. This results from the pivotal support of the torsion spring between slats and the freedom of deflection of the arms by reason of the cutouts.

It will be understood that the torsion spring may be formed of spring wires other than round and that the looped portion can be formed with a part of or of any number of loops. In a typical assembly of the type illustrated, the looped portion is formed of two loops of 1 inch diameter with the upper bail extending from the horizontal axis of the loops at an angle of about 41° while the lower bail extends downwardly from the horizontal axis at an angle of about 44°, to provide an included angle of 85°.

Instead of the tongue and groove arrangement for securing the strips onto the slats, other fastening means can be employed and, instead of making use of a continuous strip extending across the slats, the strip can be subdivided into segments spaced pivotally to engage the inturned bail end portion of the coil spring.

It will be understood that changes may be made in the details of construction, arrangement and operation without departing from the spirit of the invention, especially as defined in the following claims.

I claim:

1. In a torsion spring assembly, a torsion spring formed of spring wire having a pair of U-shaped members angularly disposed relative to each other and integrally joined at their inner ends by looped portions and means mounting a plurality of said U-shaped members in longitudinally spaced relation onto a support comprising an elongate strip, a lengthwise extending bore within said strip having a cross section dimensioned to receive the bail portion of said U-shaped members, a slot extending from the upper surface of the strip to the bore with the portion of the slot adjacent the bore having a width less than the cross section of the wire of the bail portion whereby the bail portion can be inserted through the slot into the bore and is retained within said bore when in the assembled relation, spaced pairs of cutouts extending crosswise through the bore and the cutout in each pair being spaced longitudinally by an amount corresponding to the spaced relation between the arms of the U-shaped member whereby the arms are crosswise aligned with said cutout portions when the bail portion is in position of assembly within the bore, and means for securing the strip to a support.

2. A spring assembly as claimed in claim 1 in which the means for securing the strip to a support comprises a tongue and groove arrangement with the tongue in one of said members and the groove in the other to receive the tongue in seated relation therein.

3. A torsion spring assembly as claimed in claim 1 which includes a frame and in which the support comprises an elongate strip member secured to the frame.

4. A torsion spring assembly as claimed in claim 1 in which the bail portion adapted to be received in the bore of the strip in the assembled relation comprises short lengths of wire turned inwardly from the ends of the opposite arms of the U-shaped portion.

5. A torsion spring assembly as claimed in claim 1 in which the slot extending to the bore is of trapezoidal shape in cross section with the base of larger dimension outermost.

* * * * *